United States Patent [19]
Lavallee et al.

[11] Patent Number: 5,737,552
[45] Date of Patent: Apr. 7, 1998

[54] MACHINE, METHOD AND MEDIUM FOR LINEAR PROGRAMMING WITH INTERACTIVE CONVERSATIONAL INTERFACE

[75] Inventors: David Anthony Lavallee, Mercer Island; Gregg S. Foster, Seattle, both of Wash.

[73] Assignee: Starwave Corporation, Bellevue, Wash.

[21] Appl. No.: 508,971

[22] Filed: Jul. 28, 1995

[51] Int. Cl.$^6$ .............................. G06F 3/00; H04N 7/173
[52] U.S. Cl. .................. 395/328; 395/806; 395/357; 348/7; 348/13
[58] Field of Search .................... 395/328, 327, 395/357, 329, 356, 972, 326, 762, 806; 348/10, 7, 12, 13; 434/309, 315, 323

[56] References Cited

U.S. PATENT DOCUMENTS

| | | | |
|---|---|---|---|
| 4,333,152 | 6/1982 | Best | 395/327 |
| 5,109,482 | 4/1992 | Bohrman | 395/328 |
| 5,428,731 | 6/1995 | Powers, III | 395/762 |
| 5,524,195 | 6/1996 | Clanton, III et al. | 395/327 |
| 5,537,141 | 7/1996 | Harper et al. | 348/12 |
| 5,553,221 | 9/1996 | Reimer et al. | 395/328 X |
| 5,596,705 | 1/1997 | Reimer et al. | 395/326 |
| 5,623,587 | 4/1997 | Needham et al. | 395/356 |

OTHER PUBLICATIONS

Chris Adamson, "Dragon's Lair II: Time Warp", Back to CD-i Reviews and Info., Mar. 2, 1995.

Chris Adamson, "Space Ace ", Back to CD-i Reviews and Info., Jan. 29, 1995.

*Primary Examiner*—Raymond J. Bayerl
*Attorney, Agent, or Firm*—Hale and Dorr LLP

[57] ABSTRACT

A machine, method and computer-readable medium for allowing program information to be conveyed to the user in a linear fashion, while also allowing the user to request additional program information relating to a particular "scene" that they are viewing. If a user is dissatisfied with the current scene they are viewing, they can request "alternate" program information. This is accomplished by dividing the program information conveyed to a user into scenes, any of which may have additional program information associated with it. When additional program information is requested, the appropriate scene associated with the current scene is conveyed to the user. Conversely, if a user requests alternate program information, then the requesting scene is conveyed to the user. If there is no requesting scene, then the next scene at the same level is conveyed to the user.

90 Claims, 6 Drawing Sheets

5,737,552

MACHINE, METHOD AND MEDIUM FOR LINEAR PROGRAMMING WITH INTERACTIVE CONVERSATIONAL INTERFACE

BACKGROUND OF THE INVENTION

1. Field of the Invention

The present invention relates to a machine, method, and computer-readable medium for combining the linearity of conventional television and video programming with interactive capabilities, allowing a user to easily obtain additional program information on the topic being viewed, or to reject the current topic and obtain alternate program information which could be in the form of a more general presentation of the previously viewed topic or a different topic altogether. More specifically, embodiments of the present invention contemplate a machine, method and computer-readable medium for allowing the user to obtain additional program information about the specific scene they are viewing by actuating a first control (e.g., pushing an "additional information" button), or to reject the current scene being viewed by actuating a second control (e.g., pushing an "alternate information" button) to obtain alternate program information.

2. Related Art

In the past few decades, people have been increasingly demanding more and more from home entertainment systems, especially from television. The growth in this area became particularly intense with the introduction and mass acceptance of "cable" television. In fact, at present, the limits of bandwidth for delivery of cable television programming are being pushed as far as possible as users demand more variety and more channels from their television sets.

The program information delivered using the conventional television systems mentioned above are linear in nature, in that when a user activates the television, program information will continue to be received in a set sequence that has been predetermined at the television station. In this situation, once the television is turned on, the program information is received indefinitely (or at least until the television station shuts down for the night) without the user having to take any further action.

In addition to more channels to provide users with a greater variety of "linear" programming, users are now also demanding the ability to access programs that they want to see when they want to see them. Thus, they want the ability to "interactively" control the programs that are being delivered to them. This concept is, of course, different from changing the channel on a conventional television system, where a user merely is choosing from one of several available linearly-running programs pre-determined at the television station.

One relatively primitive form of an existing interactive program scheme is "pay-per-view," where a television user views previews of one or more movies available to them at certain times, and can then call a specified telephone number to have a particular movie delivered to their television at a specified channel. Another existing interactive program scheme can be found in many hotel television systems, where a user can turn to a particular channel and preview scenes from movies available to the user. If the user sees a movie that they would like to watch, they can press a button which displays a menu of available movies. The user can then select a movie from the menu for viewing.

With the coming of two-way interactive home television systems, home users will soon be able to perform the same functions that can presently be performed with hotel systems, and more. For example, in addition to choosing movies, home television users will be able to purchase items, play interactive games, etc., through the use of their televisions. In fact, such systems are currently being tested in selected communities. Further, the same concepts are also being applied to computer systems operating over on-line networks such as the internet.

One way for implementing the interactive television system mentioned above is to allow for the transmission of command signals from the user to the content supplier (e.g., a cable television station) to allow the user to indicate, for example, what program they wish to watch. These command signals could be sent at a rate of, for example, 300-64 k baud. Once the command signals have been received, the user would then receive the program information that they selected. Typical transmission rates and schemes for delivering the requested program information include 1.5 Mbit/s (low-level MPEG) and 6 MHz (NTSC).

A problem with the interactive television schemes discussed above is that they do not encompass desired qualities of conventional linear programming. Specifically, if a user does not make a selection, the result will be that a relatively short preview summary will merely run over and over again, or that a menu will stay fixed on the screen indefinitely, etc. Thus, unless the user makes choices, he or she would not have the benefit of continuously receiving new program information. Further, to make a selection, the user often has to go through a burdensome menu process to obtain the desired information.

Thus, what is needed is a scheme for intermixing the desirable qualities of conventional linear programming with interactivity such that a user can view a program as they would conventional television, and can then (if they desire) obtain additional program information concerning what they are watching, without the need for navigating through a host of menus. In addition to television, it is also desirable that such a system could function over other networking schemes, such as with on-line networks provided through, for example, internet facilities such as the world-wide web.

SUMMARY OF THE INVENTION

The present invention addresses the problems described above by providing a machine, method and computer-readable medium for allowing program information to be conveyed to the user in a linear fashion, yet also allowing the user to request additional program information relating to a particular "scene" that they are viewing. Also, if a user is dissatisfied with the current scene they are viewing, they can request "alternate" program information.

The present invention accomplishes this by dividing the program information conveyed to a user into scenes, any of which may have additional program information associated with it. Embodiments of the present invention contemplate that the additional program information (which is, itself, another scene), has some location corresponding to it. This location can, for example, be in terms of an address or in terms of time. The "requesting" scene then would have the location of the additional information associated with it, such that when additional program information is requested, the scene corresponding to the location for additional program information is conveyed to the user. Conversely, if a user requests alternate program information, then in embodiments contemplated by the present invention, the requesting scene is conveyed to the user. If there is no requesting scene (e.g., the user did not previously request additional information and thus the scene being viewed is a "top-level" scene) then in embodiments contemplated by the present invention, the next scene at that level is conveyed to the user.

The present invention contemplates (as being a part of, and in its entirety) various single and multiple-user conveyance schemes, including those utilizing internet and other on-line services, conventional cable, RF television technology, telephone technology, and other similar or related technologies now known or to be developed. In addition, embodiments of the present invention contemplate that the program information can reside on a local user device (e.g., the entire embodiment is, or is part of, a computer).

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION

The present invention relates to a machine, method and computer-readable medium for combining the linearity of conventional television and video programming with interactive capabilities, allowing a user to easily obtain additional program information on the topic being viewed, or to reject the current topic and obtain alternate program information which could be in the form of a more general presentation of the previously viewed topic or a different topic altogether. More specifically, embodiments of the present invention contemplate a machine, method and computer-readable medium for allowing the user to obtain additional program information about the specific scene they are viewing by actuating a first control (e.g., pushing an "additional information" button), or to reject the current scene being viewed by actuating a second control (e.g., pushing an "alternate information" button) to obtain alternate program information.

In achieving the above, the present invention contemplates that when program information is presented to a user, the user has a choice between requesting additional (e.g. more specific) program information concerning what is shown, or requesting alternate program information. By "alternate," embodiments of the present invention contemplate that this can mean either 1) more generalized program information concerning the program information currently being viewed or 2) program information relating to a different topic. Whether 1) or 2) is received by a user requesting "alternate" information depends upon the hierarchical level of the current scene (as explained below) and/or the specific embodiment contemplated.

More specifically, in operation of embodiments contemplated by the present invention, if the user does not request either additional or alternate information, the program information received by the user will be like any conventional, linear program. If, however, the user requests additional program information, the present invention then conveys additional program information corresponding to the scene that the user was viewing at the time the signal was sent. Thus, an additional "level" of detail can be thought of as having been transcended to by the user. The present invention contemplates that any number of levels can potentially be transcended to.

If the user becomes disinterested with the program information currently being viewed, the user can request "alternate" information. Then, depending upon the level to which the user transcended (and the particular embodiment), the program information received by the user will be either the next linear portion (e.g., scene) of program information at the same level or else the program information from which the current program information was requested.

Figure 1:
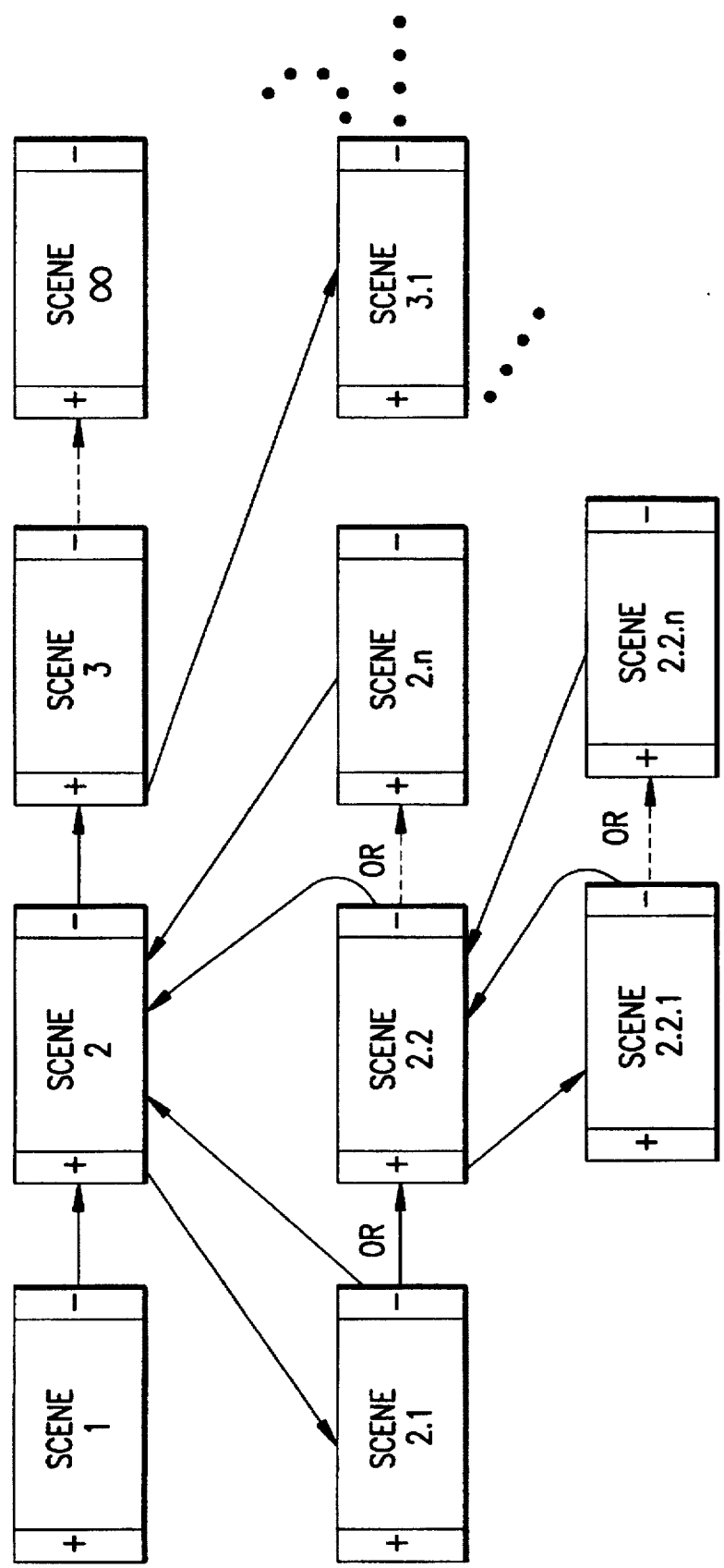
FIG. 1 is an example of a hierarchial scene structure as contemplated by embodiments of the present invention.

The general operation envisioned by embodiments of the present invention can be further explained with regard to FIG. 1. Referring now to FIG. 1, "linear programming," as shown by scenes 1, 2, . . . etc., to infinity, is contemplated to be initially conveyed to the user for viewing. Each of these scenes can be thought of as logical program segments of the program information conveyed to the user. For example, scenes 1–5 may be part of a talk show where, in each scene, a different guest is promoting a particular product. Similarly, each scene could also be a preview to a movie, or a description of particular products in a home shopping-type arrangement.

As indicated above, embodiments of the present invention contemplate that when a user first activates the present invention, the various scenes are conveyed linearly in a similar way as information is conveyed to a viewer of conventional television. That is, the user will receive program information in the form of one pre-determined scene after another (although the present invention does also contemplate embodiments allowing a multi-channel environment that might also allow the user to select a specified starting point for the receipt of program information from a particular channel). If a user does not indicate that they wish to receive additional or alternate program information, the pre-determined, linear program information will be conveyed to the user indefinitely in a similar manner to conventional television.

Still referring to FIG. 1, assume that in "Scene 2" as shown in the Figure, an athlete is endorsing his brand of home fitness equipment. If the user wanted more information concerning the endorsed products, he or she can indicate this (e.g., by activating a control device) while that particular endorsement is being viewed. A signal would then be sent to the device that actually conveys and/or stores the program information conveyed to the user (discussed below), indicating that additional program information relating to the products should be sent to the user. In this particular example, Scene 2.1 represents a first portion of the additional program information concerning the home fitness equipment (note that a "+" pointer associated with Scene 2 points to Scene 2.1).

Continuing with the example mentioned above, Scene 2.1 might be a specific discussion concerning a type of stationary bicycle, while Scene 2.2 might represent additional program information concerning a bench-press machine. When the user begins viewing scene 2.1, again, the user has the option of not requesting additional (or alternate) information, in which case, the scenes at this second hierarchical level would be viewed linearly (e.g., Scene 2.1, Scene 2.2, ... Scene 2.n). In that situation, when the end of Scene 2.n is eventually reached, embodiments of the present invention contemplate that the program information subsequently conveyed to the user will be the original requesting scene (i.e., Scene 2) or, in other embodiments contemplated by the present invention, it might be the scene after the requesting scene (i.e., Scene 3). The former embodiment is depicted at FIG. 1, indicated by the arrow pointing from Scene 2.n back up to Scene 2.

If a user is viewing scene 2.1 but is not interested in receiving information concerning stationary bicycles, they can indicate that they wish to receive alternate information (again, by activating some control device). Depending upon the particular embodiment of the present invention, this would cause the user to next receive either the next linear scene at the same level (i.e., Scene 2.2 depicting the bench-press machine) or else receive information from the requesting scene at the next-highest level (i.e., Scene 2). Thus, the control device could have a single actuator for requesting alternate information. However, other embodiments of the present invention also contemplate the utilization of at least two controls for indicating the request of alternate information where, for example, one control would bring the user to Scene 2 from Scene 2.1, and the other would bring the user to scene 2.2. Of course, the present invention also contemplates any number of other types of configurations as well, e.g., a single actuation (e.g., mouse click) of an "alternate information" actuator generates one result, and a double actuation (e.g., double click) generates another.

As indicated above, the present invention contemplates that potentially any number of different hierarchical levels can be implemented. For example, if the user is viewing scene 2.2 concerning the bench-press, and wants even more detailed program information, they can indicate this, and obtain Scene 2.2.1, showing detailed information concerning the bench-press.

As represented in FIG. 1, the "+" portion of each Scene indicates some type of pointer through which additional program information relating to that particular scene can be obtained. Conversely, the "–" portion indicates some type of pointer through which "alternate" information can be obtained (although alternatively, the location/time of the requesting scene can be stored, and then recalled when the additional information has ended on its own or by user request).

Any number of schemes for implementing the hierarchal level scheme depicted by FIG. 1 are contemplated by the present invention, some of which are discussed in greater detail below. In any event, it should be understood that the present invention further contemplates that program information that has no corresponding additional program information (e.g., as would be the case for conventional television programs) can also be used in conjunction with the present invention. For example, some Scenes can have additional program information associated with them, while others would not.

One implementing scheme contemplated by embodiments of the present invention utilizes a time code developed by the society of movie picture and television engineers (SMPTE). The SMPTE time code, typically used by video editors to locate and obtain specific portions of media, is in the format HH:MM:SS:FF, where HH is a two digit integer between 0 and 24 (representing hours), MM is a two digit integer between 0 and 59 (representing minutes), SS is a two digit integer between 0 and 59 (representing seconds), and FF is a two digit integer between 0 and 29 (representing a specific frame).

Figure 2:
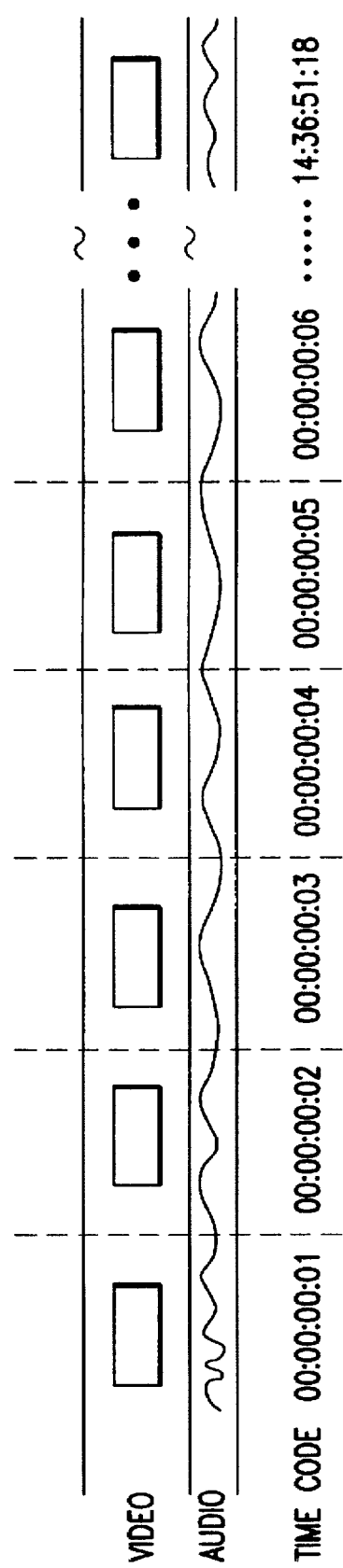
FIG. 2 is an example of conventional SMPTE time code.

The way in which SMPTE time code may be used with program information in a conventional fashion can be seen from FIG. 2. Referring now to FIG. 2, the specific "frames" of a medium are depicted between the dotted lines, and are shown as having a video and audio portion, as well as having an associated time code. Thus, the left-most frame depicted in this Figure represents the very first frame of the medium. At the far right, as indicated in this example, is the last frame of the medium, indicating a "time" location of fourteen hours, thirty-six minutes, fifty-one seconds and eighteen frames.

When an editor wants to obtain a particular portion of a medium or media that uses the SMPTE time code, a convention known as an "Edit Decision List" (EDL) is used. This allows one to designate and request a beginning frame and an ending frame to be obtained. A conventional example of a typical structure used to implement this using the C programming language is as follows:

```
struct SMPTE_TIME_CODE = }
    int hour;       /* hours, 0..23 8/
    int. minute;    /* minutes, 0..59 */
    int. second;    /* second, 0..59 */
    int. frame;     /* frame, 0..30 */
    };
typedef fd VIDEO_FILE;
struct EDL_SEGMENT - {
    VIDEO_FILE reel;        /* video source reel */
    SMPTE_TIME_CODE in;     /* SMPTE code for the beginning
                               of this segment */
    SMPTE_TIME_CODE out;    /* SMPTE code for
                               the end of this segment */
    EDL_SEGMENT *next;      /* pointer to the next Edit
                               Decision List segment 8/
};
```

For additional information concerning EDL and SMPTE, see, for example, "Nonlinear: A Guide to Electronic Film and Video Editing," by Michael Rubin, Second Edition, Triad Publishing, ISBN 0-9374404-83-7, which is incorporated by reference herein.

Figure 3:
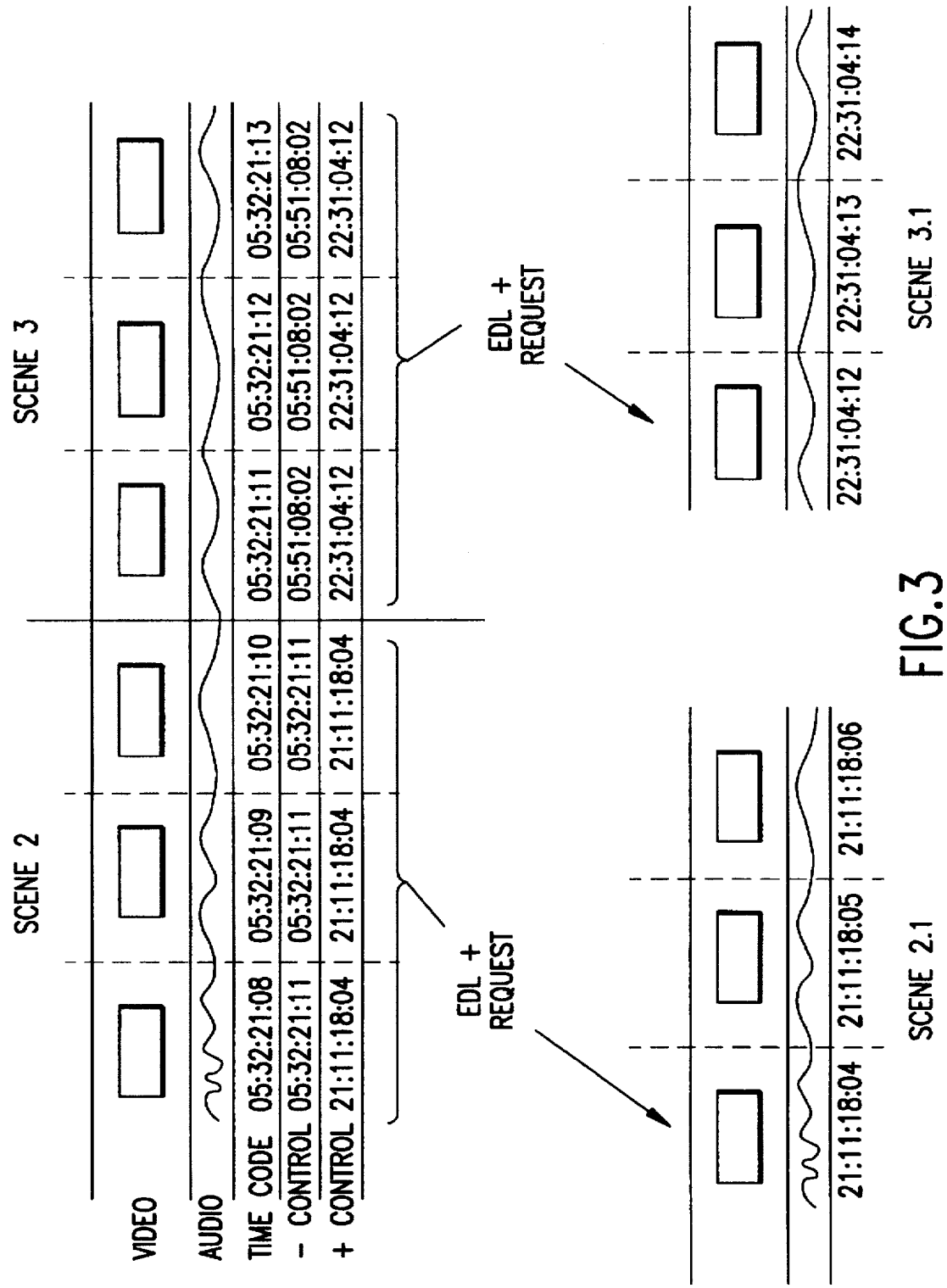
FIG. 3 is an example of extended SMPTE time code and EDL utilization as contemplated by embodiments of the present invention.

The way in which various embodiments of the present invention make use of (and expand upon) the SMPTE and EDL concepts for the purpose of implementing the scheme described in, for example, FIG. 1, is shown by FIG. 3. Referring now to FIG. 3, the video, audio and associated time codes of two consecutive "Scenes" are depicted. In addition, and in accordance with embodiments of the present invention, two other features are associated with each scene, namely, a "–control" and a "+control." Specifically, the "+control" indicates the SMPTE location of additional program information corresponding with that particular scene. Thus, in the example of FIG. 3, if a user indicates that additional program information is desired while viewing Scene 2, program information beginning at SMPTE location 21:11:18:04 (i.e., Scene 2.1) will be conveyed to the user.

Embodiments of the present invention also contemplate that the information in "+control" for a particular scene may also contain the last frame of the additional program information or segment that the user requests. This indicates to the present invention (in advance) when to end the conveyance of the additional program information and return, e.g., to the requesting scene. Thus, in those embodiments, the first frame and the last frame of the additional program information corresponding to the scene being viewed would be part of "+control." Of course, other embodiments are also contemplated, such as that the additional program information has an associated end marker indicating that the current scene is the last scene in the level, and that the "requesting" scene should next be conveyed to the user.

In addition to "+control" information, the present invention also contemplates that "−control" information can be associated with each scene. Thus, Scene 2.1 might have minus control information that "points" to either Scene 2 or Scene 3, depending upon the embodiment. In scene 2, the "−control" information therein is shown to be associated with scene 3 (i.e., 05:32:21:11 is associated with the first frame of the program information of scene 3). Thus, when a user is viewing scene 2 and requests "alternate" information, the result will be that the program information of Scene 3 is conveyed to the user. As another example, "−control" information (not shown) that may be associated with Scene 2.1 might be, for example, 05:32:21:08, which is associated with Scene 2.

Another way to implement conveying alternate information to a user, as contemplated by embodiments of the present invention, is to store the "time" (i.e., the SMPTE location) of the requesting scene on, for example, some type of "stack." Then, when the user makes the request for alternate information, the SMPTE location is popped off the stack and an EDL request is utilized to convey the appropriate scene to the user.

In the example of FIG. 3, it can be seen that Scenes 2 and 3 are at the top level of the hierarchy in this example. It should be understood, though, that embodiments of the present invention contemplate situations where there will be no "−control" information associated with the scenes of the top level. In general, it will be up to, for example, the provider of the program information to decide how to implement the various embodiments of the present invention.

Embodiments of the present invention contemplate that the "+control" and "−control" aspects can be associated with the program information in a number of ways. For example, it can be implemented as a part of a computer file or video tape containing the actual video information. Also, it can be placed in, for example, its own computer file which is read and matched with the video information at the time the video information is being utilized.

Embodiments of the present invention contemplate that the program information itself can be stored on a variety of different media, including video tape, hard or floppy disk, CD ROM, a variety of different types of RAM, etc. Where the program information exists on a digital storage device such as a hard disk drive or CD ROM, various tools are available to assist in the utilization of the EDL, such as subroutines available in the Media Control Interface (MCI) API provided in the Win32 Software Developer's Kit from Microsoft Corporation of Redmond, Wash. As inputs, these subroutines expect a beginning SMPTE time code, an ending SMPTE time code, and the name of the file containing the program information. The output is then the requested program information.

With regard to the EDL scheme shown in FIG. 3, it should be understood that, although the SMPTE concept uses a 24 hour time scheme, the length of linear program information conveyed to the user can be of any length. One way of implementing this would be to simply run different "portions" (of 24 hours or less) consecutively, where each portion would contain two or more linear scenes at the top level, and their related additional program information. Other SMPTE configurations are also contemplated.

An example of a structure written in the C programming language for implementing EDL for use with embodiments of the present invention, is shown below. Also shown below is an example showing a generalized implementation of embodiments of the present invention, also written in the C programming language:

```
#define TRUE 1
#define FALSE 0
typedef fd VIDEO_FILE;
struct SMPTE_TIME_CODE = {
    int hour;    /* hours, 0..23 */
    int minute;  /* minutes, 0..59 */
    int second;  /* second, 0..59 */
    int frame;   /* frame, 0..30 */
};
struct EDL_SEGMENT = {
    VIDEO_FILE reel;         /* video source reel */
    SMPTE_TIME_CODE in;      /* SMPTE code for the beginning of
                                this segment */
    SMPTE_TIME_CODE out;     /* SMPTE code for the end of this
                                segment */
    EDL_SEGMENT * next;      /* pointer to the next Edit Decision List
                                segment */
};
struct SDITV_SEGMENT = {
    VIDEO_FILE reel:         /* video source reel */
    SMPTE_TIME_CODE in;      /* SMPTE code for the beginning of
                                this segment */
    SMPTE_TIME_CODE out;     /* SMPTE code for the end of this
                                segment */
    SDITV_SEGMENT * next;    /* pointer to the next SDITV List
                                segment */
    SDITV_SEGMENT * previous; /* pointer to the previous SDITV List
                                segment */
    SDITV_SEGMENT * plus;    /* pointer to plus SDITV List
                                Segment */
    SDITV_SEGMENT * minus;   /* pointer to minus SDITV List
                                Segment */
};
void runSDITV (head)
    SDITV_SEGMENT head;
{
    SDITV_SEGMENT segment = 0;
    SDITV SEGMENT previous_segment = 0;
    segment = play (head.reel);
    while (segment_playing( )) {
        play_from_to (segment.reel, segment.in, segment.out);
        switch (possible_events) {
            SEGMENT_ENDED:  previous_segment = segment;
                            segment = play
                            (previous_segment.next);
                            break;
            USER_HIT_PLUS:  previous_segment = segment;
                            segment = play
                            (previous_segment.plus);
                            break;
            USER_HIT_MINUS: if (! previous_segment) {
                                segment = segment.next;
                            }
                            else {
                                segment = previous_segment;
                            }
                            segment = play (segment.minus);
                            break;
        }
    }
}
```

Although the C programming language is used as the basis for this example, it should be understood that any programming language could also be used. It should also be understood that the present invention is not limited to utilization of the SMPTE/EDL scheme of FIG. 3, and contemplates a variety of other schemes as well.

Figure 4:
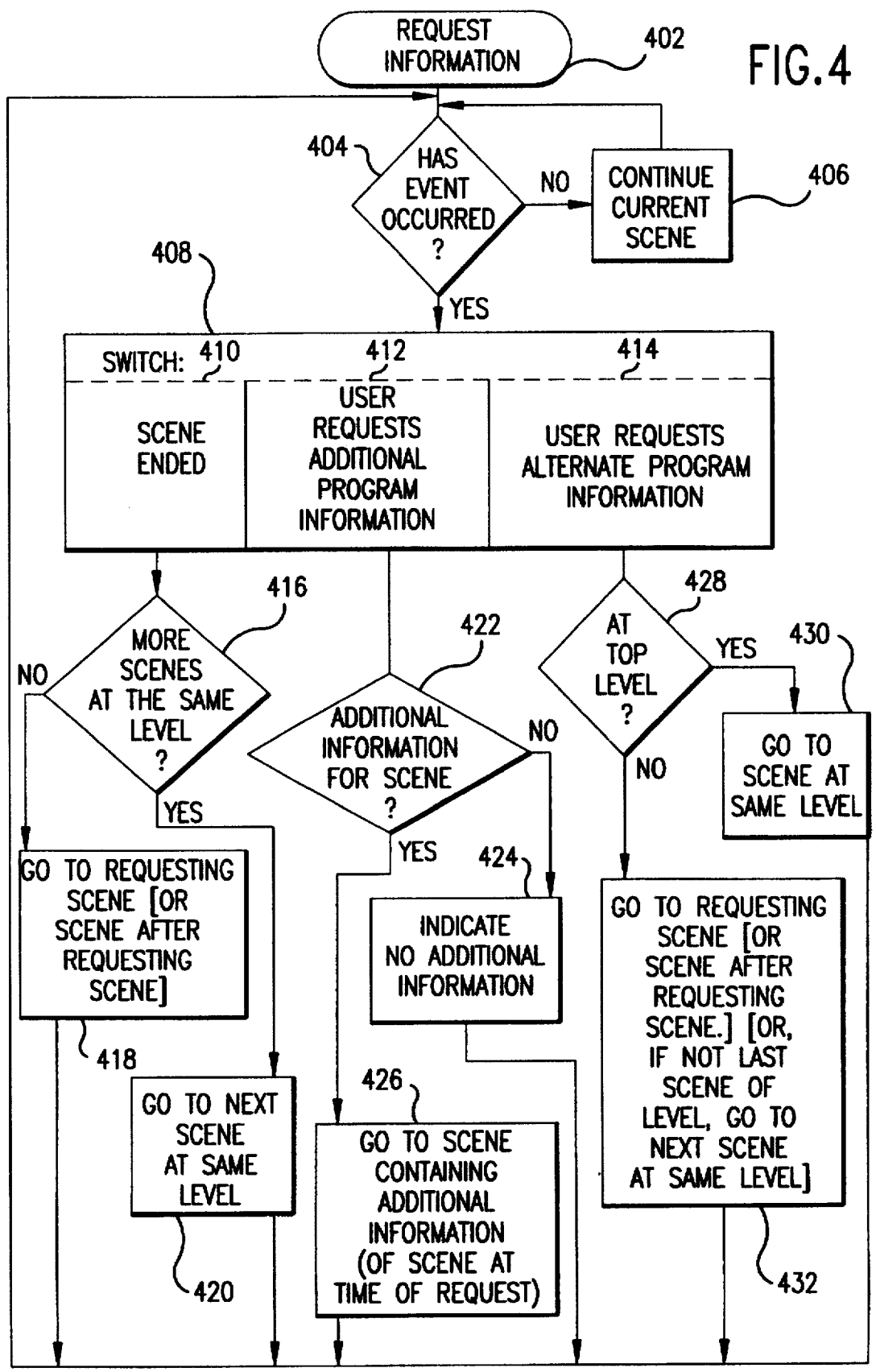
FIG. 4 is a flow diagram of a method contemplated by embodiments of the present invention concerning the processing of specified events.

Embodiments of a method of operation contemplated by the present invention are shown with regard to the flow chart of FIG. 4. This flow chart, as drawn, assumes a constant supply of program information, although embodiments of the present invention contemplate situations where this is not the case.

Referring now to FIG. 4, the first event that occurs is that the user requests program information, as indicated by a block 402. This, for example, could be accomplished in the same way that a user first requests information in a conventional television system, i.e., by turning on the television. In embodiments where the user is viewing the program information via a computer (as discussed below) the user might turn on the computer and activate a computer program to initiate the viewing of program information.

Once the program information is conveyed to the user, the current scene will continue to be shown until some event has occurred, as indicated by decision block 404 and block 406. Thus, where no event occurs, the current scene will continue to be conveyed to the user.

If, however, an event has occurred, then depending upon the particular event, a specified action will be taken. Embodiments of the present invention contemplate that the possible events include those shown in a switch block 408. Referring to block 408, the first event that might occur is that the scene ends. This is indicated by a sub-block 410. This is an event that is not initiated by the user, but occurs automatically at the end of a scene. When it does occur, the specific action taken will depend upon whether there are more ensuing scenes at the hierarchical level of the scene that ended. This is indicated by a decision block 416. If there are, program information relating to the scene at the same hierarchical level are then conveyed to the user, as indicated a block 420. Referring back to FIG. 1 as an example of this, this would be where scene 2.1 ends, and scene 2.2 is then conveyed to the user.

Referring back to FIG. 4 and decision block 416, if there are no more scenes at the same level, then the requesting scene (i.e., the scene from which additional program information was requested) will be conveyed back to the user (at, for example, the point where the user originally requested additional program information), as indicated by a block 418. As an alternative to that, other embodiments contemplate that some other scene at the prior hierarchical level (such as the scene after the requesting scene) will be conveyed to the user, also as indicated by a block 418. (The text in square brackets indicates alternate embodiments). Of course, it should be understood that the present invention is not limited to the embodiments (alternate or otherwise) specifically mentioned in this Figure.

Referring back to FIG. 1 for an example of a situation relating to block 418, assume a user is viewing scene 2.n, and that the scene ends. The program information then conveyed to the user would be either scene 2 or scene 3 (depending upon the embodiments implemented).

Referring back to FIG. 4 and sub-block 410, it should be recognized that, where the scene being viewed is at the top hierarchical level (e.g., scene 2) and the scene has ended, embodiments of the present invention contemplate that the sequence of events will flow through decision block 416, then block 420 (since there will be more scenes at that level). Thus, continuous, linear program information is conveyed to the user when the user does nothing (i.e., when the user does not request additional or alternate program information). It should also be apparent that the conveyance of linear information at the top level also eventually results when a user is viewing a scene at a lower hierarchical level, and then does nothing (since the information conveyed will eventually pop up to the top level, as previously indicated by decision block 416 and block 418). That is, linear program information is conveyed to the user where no request is made by the user after a period of time has elapsed.

Referring again to block 408 of FIG. 4, another event that might occur is that the user requests additional program information, as indicated by a sub-block 412. However, as indicated by decision block 422 and block 424, there might be no additional program information for the scene being viewed. This might occur when, for example, the user has reached the bottom level (e.g., in FIG. 1, scene 2.2.1), or when a particular top-level scene that the user is viewing simply does not have any additional program information associated with it. In those situations, various embodiments of the present invention contemplate that, for example, either nothing will happen when the user requests additional program information, or else some type of error signal will be conveyed to the user.

If, however, the user requests additional program information while viewing a scene having corresponding additional program information, the additional program information will then be conveyed to the user, as indicated by a block 426. Thus, referring back to FIG. 1, an example of this situation would be where a user is viewing scene 2, requests additional program information, and is then conveyed program information corresponding to scene 2.1.

Referring back again to block 408 of FIG. 4, another event that could occur is that the user requests "alternate" program information, as indicated by a sub-block 414. When that occurs, and if the user is viewing a scene at the top hierarchical level, then embodiments of the present invention contemplate that the next scene at the same level be conveyed to the user, as indicated by a decision block 428 and a block 430. However, other embodiments of the present invention contemplate that requesting alternate program information at the top level results in nothing happening at all, or that some signal indicating an error and/or that the top level has been reached be conveyed to the user.

If, however, the user requests alternate program information and the user is viewing a scene that is not at the top level, then in embodiments contemplated by the present invention, the requesting scene (at the next highest level) will be conveyed to the user or (depending upon the embodiment) the scene after the requesting scene will be conveyed to the user, as indicated by a block 432. In other embodiments, if the scene is not the last scene at the level being viewed by the user at the time of the request, then the next scene at that current level would be conveyed to the user upon a request for alternate information, as indicated by a block 432. The present invention also envisions embodiments allowing a user to request more than one form of alternate program information, such that they can choose whether, for example the requesting scene or the next scene at that current level is conveyed to them.

Referring back to FIG. 1 for examples of the concepts indicated by block 432, and referring specifically to scene 2.2, when the user requests alternate information, the next scene conveyed to the user could be either scene 2 (the requesting scene) or scene 3 (the scene after the requesting scene). Also, in various embodiments of the present invention, when alternate information is requested at scene 2.2, the next scene (if any) at that current level (i.e., scene 2.n) is conveyed to the user, rather than conveying, e.g., the requesting scene. The embodiment chosen depends upon the desired overall result. However, as indicated above, the present invention is not limited to the various implementations specifically described herein.

Figure 5:
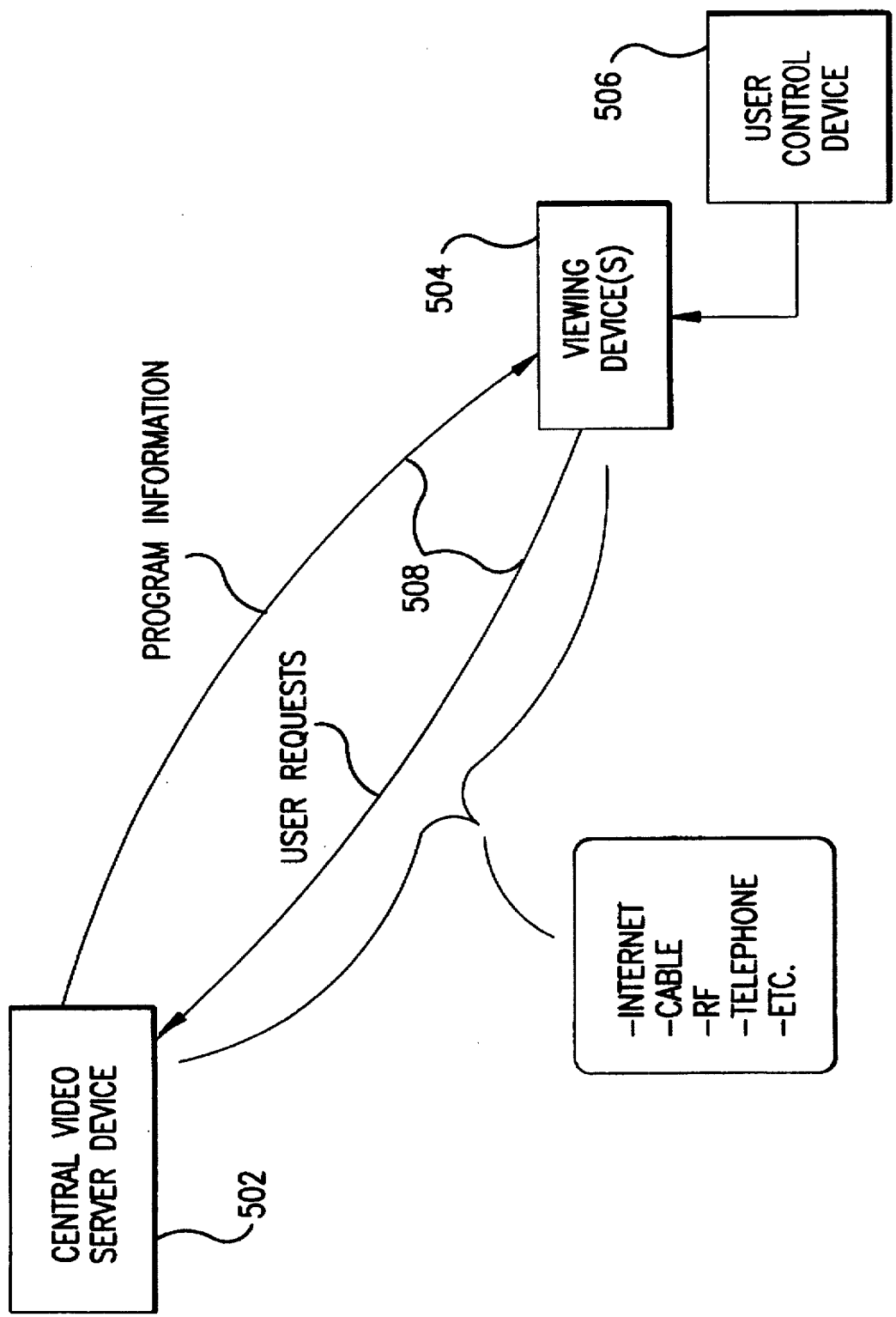
FIG. 5 is a block diagram of the present invention (and environments thereof) depicting various components and the conveyance of program information and user requests.

Various examples of the way that the program information can be conveyed to the user, and ways that the user can convey requests for additional or alternate program information, will be explained with regard to FIG. 5. Referring now to FIG. 5, a central video server device 502 is shown, within which various program information or "content" is provided. Embodiments of the present invention contemplate that this central video server device can use any number of types of media for storing the program information, including film, video tape, magnetic storage device, cd-ROM or other optical storage device, atomic or biological storage devices, etc., so long as the media allows for the implementation of some scheme by which "additional" program information for scenes can be stored and accessed upon request by a user. Embodiments of the present invention also contemplate that central video server device 502 contains and/or is controlled by one or more computer devices, which serve to process user requests and convey appropriate program information to users (of which there could be any number). A specific example of the central video server device 502 as contemplated by embodiments of the present invention is an IBM PC or PC-compatible device with a 100 Mhz (or faster) processor, using the Microsoft NT operating system running the Microsoft Media Server software. A specific example of type of mechanism for implementing the present invention for use with multiple users over, for example, a cable television system, is a Hybrid Fiber Coax network manufactured by Scientific Atlanta of Atlanta, Ga. Of course, any number of different types of media server software or multi-user systems are also contemplated.

Embodiments of the present invention contemplate that the program information can be constantly sent to one or more viewing devices(s) 504. Other embodiments envision that some type of user request must first be initiated before the program information is conveyed. In any event, the present invention contemplates the use of any number of different types of conveyance schemes 508 to facilitate the conveyance of program information to the user and to facilitate the conveyance of user requests to the central video server 502.

Some specific types of conveyance schemes 508 include use of the internet (possibly utilizing the world-wide-web) or other on-line facilities, cable television, radio or microwave frequency broadcast, the telephone system (e.g., used as a conventional cable TV scheme), or any other similar or related technology now known or to be developed. Thus, viewing device(s) 504 could be, for example, conventional television sets, conventional computer devices, hybrids thereof, or some other devices altogether for allowing users to receive program information and request additional or alternate information based upon the scene they are viewing.

Regardless of the type of device used for viewing device (s) 504, a user control device 506 is contemplated to be used with viewing device (s) 504 to allow a user to request additional or alternate program information. Embodiments of the present invention contemplate that the user control device 506 might be nothing more than a remote control or some other type of input device (e.g., a mouse) having only two controls (e.g., buttons), one for indicating that additional program information is requested, and the other for indicating that alternate information is requested. Embodiments of the present invention also envision that three controls may be appropriate where it is desirable that a user be given a choice of requesting alternate program information in the form of either, e.g., the requesting scene or the same scene at the same level (as described above). In any event, embodiments of the present invention contemplate that viewing device (s) 504 has appropriate input facilities to allow user control device 506 to be used (or that user control device 506 is an integrated part of viewing device (s) 504).

Embodiments of the present invention contemplate that the program information and user requests of conveyance scheme 508 might utilize different modes of transmission. For example, program information may be conveyed to a user via conventional cable television networks at a rate of, e.g., 1.5 Mbit/s (low-level MPEG) to 6 MHz (NTSC), while user requests may be conveyed via telephone, using a conventional modem operating at somewhere between 300-64K baud. Of course, other speeds and modes are also contemplated by embodiments of the present invention.

Figure 6:
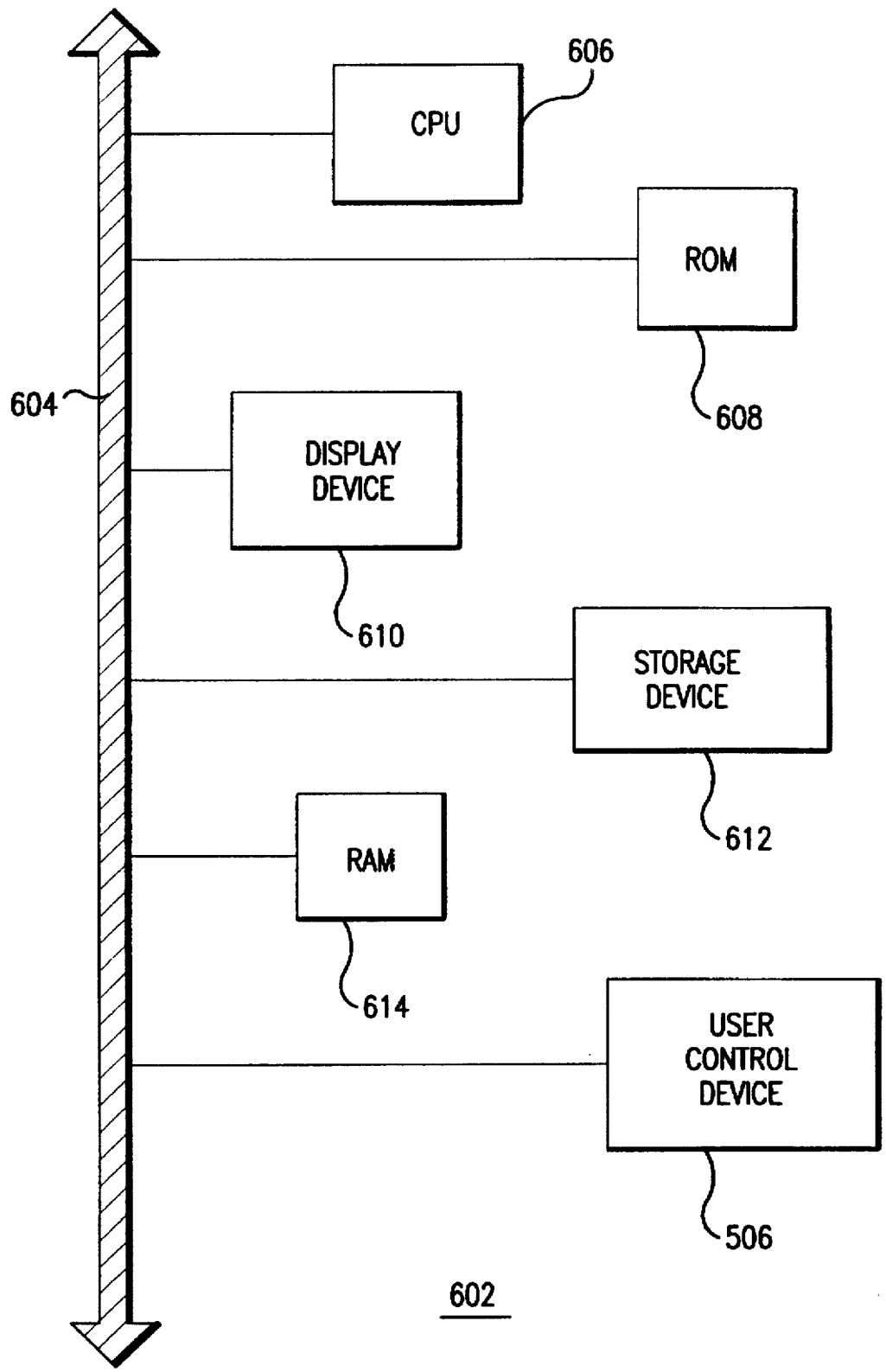
FIG. 6 is a block diagram of a computing device as envisioned by various embodiments of the present invention.

As indicated above, both the central video server device 502 and the viewing device (s) 504 could each include (or be) a computer device for performing the functions mentioned herein. Such a device is shown in FIG. 6. Referring now to FIG. 6, a computing device 602 is shown, which can be used in conjunction with either viewing device (s) 504 or central video server device 502 (or both). However, embodiments of the present invention do contemplate that central video server device 502 and viewing device (s) 504 could be the same device where, for example, the program information resides on the user's "local" computer.

Still referring to FIG. 6, a bus 606 is shown as the backbone connecting various components. The bus could use any number of standard architectures, including ISA, EISA, Microchannel, PCMCIA, etc.

Storage device 612 can be any type of computer-readable medium for storing information, including those mentioned above. The storage device is contemplated to store the program information and/or some or all of the software components used to implement the present invention.

A Random Access Memory (RAM) 614 is shown, and is contemplated to possibly contain, e.g., portions of the program information after being read from the storage device 612 for display to the user, and/or some or all of the software components used to implement the present invention. It is typically used when fast, short-term storage is required, such as where software components have been requested for use, or where specified program information has been requested for display. Typical RAM storage includes DRAM and SRAM, but its function can also be performed by Flash memory, magnetic, optical or other appropriate memory devices.

A Read Only Memory (ROM) 608 is also shown, and can also contain various portions of the present invention. ROM 154 can be a conventional ROM, EPROM, EEPROM, etc.

A Central Processing Unit 606 executes various functions contemplated by embodiments of the present invention. The CPU can be any number of CPUs such as a Pentium from Intel Corporation of Santa Clara, Calif. or 68000 series from Motorola of Schaumburg, Ill. It can also be multiple CPUs tied together in a parallel processing configuration.

Embodiments of the present invention contemplate that display device 610 can be used for displaying program information to the user. Also, where it is used in, for example, the central video server device 502, the display device 610 can act as a control monitor to indicate the program information being sent to any of the terminal/TV(s).

User control device 506 (as described above) is also shown as being in contact with bus 604.

In general, computing device 602 can be any number of types of devices, including microcomputers/workstations, minicomputers, mainframes and massively parallel processing computers. Examples of microcomputers/workstations include the IBM PC manufactured from IBM Corporation of Armonk, N.Y., and the Sparc-Station from Sun Microsystems of Mountain View, Calif.; Examples of minicomputers are the VAX 750 from Digital Equipment Corporation of Maynard, Mass. and the AS/400 from IBM; an example of a mainframe is the System-390 series from IBM; and an example of a massively parallel processing computer is the Cray T3D from Cray Research of Eagan, Minn. Of course, any number of other types of computer systems are also contemplated for use with the present invention. Also, the present invention contemplates that two or more of such computer environments can be linked and used together in a network environment.

In general, it should also be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A computer-implemented method for allowing a user to obtain additional or alternate program information corresponding to a scene being viewed by the user, comprising the steps of:

(1) conveying, from a content source to the user, program information comprising one or more scenes, wherein at least one of said one or more scenes have associated control information;

(2) receiving, from the user, a signal indicating a request to receive additional or alternate program information corresponding to a current scene viewed by the user when said signal was initiated;

(3) obtaining, in response to said step (2), control information corresponding to said current scene;

(4) conveying to the user, based upon said control information of said step (3), additional program information corresponding to said current scene, when said signal indicates a request to receive said additional program information;

(5) conveying to the user, based upon said control information of said step (3), alternate program information when said signal indicates a request to receive alternate program information corresponding to said current scene; and (6) conveying linear program information to the user where no request of said step (2) is made by the user after a period of time has elapsed.

2. The method of claim 1, wherein said step (1) comprises the step of utilizing a telephone system to convey said program, additional program and alternate program information between said content source and the user.

3. The method of claim 1, wherein said step (1) comprises the step of utilizing a television system to convey said linear program, additional program and alternate program information between said content source and the user.

4. The method of claim 1, wherein said step (1) comprises the step of utilizing a computer system to convey said linear program, additional program and alternate program information between said content source and the user.

5. The method of claim 4, wherein said content source comprises a storage device on a local computer.

6. The method of claim 1, wherein said program information conveyed to the user is initially linear.

7. The method of claim 1, wherein said at least one of said one or more scenes have associated time code information.

8. The method of claim 7, wherein said time code information is SMPTE time code information.

9. The method of claim 8, further comprising the step of utilizing said control information obtained in said step (3) and obtaining said additional program information of said step (4) using an Edit Decision List.

10. The method of claim 1, wherein said step (4) comprises the step of identifying when said additional program information conveyed to the user has ended, wherein said current scene to which said additional program information corresponded is then conveyed to the user.

11. The method of claim 1, wherein said step (4) comprises the step of identifying when said additional program information conveyed to the user has ended, wherein a scene subsequent to said current scene to which said additional program information corresponded is then conveyed to the user.

12. The method of claim 1, wherein program information conveyed to the user prior to the elapsing of said period of time of said step (6) is part of said linear program information, wherein said linear program information resides at a top hierarchical level.

13. The method of claim 1, wherein said step (6) comprises the step of identifying when said additional program information of said step (4) conveyed to the user has ended, wherein said current scene to which said additional program information corresponded is then conveyed to the user, wherein said current scene is a part of said linear program information residing at a top hierarchical level.

14. The method of claim 1, further comprising the step of indicating that no additional program information is available when said signal of said step (2) indicates a request for additional program information and said current scene has no additional program information corresponding to it.

15. The method of claim 14, wherein said step of indicating that no additional program information is available comprises the step of ignoring said signal.

16. The method of claim 1, wherein said additional program information of said step (4) is at a lower hierarchical level than said current scene.

17. The method of claim 16, wherein said alternate program information of said step (5) is said current scene.

18. The method of claim 16, wherein said alternate program information of said step (5) is a scene after said current scene.

19. The method of claim 16, wherein said alternate program information of said step (5) is a scene after a scene corresponding to said additional program information, at said lower hierarchical level.

20. The method of claim 1, wherein said signal of said step (2) is generated by a user control device having a first user-actuated control for indicating a request for additional program information and a second user-actuated control for indicating a request for alternate program information.

21. The method of claim 20, wherein said second user-actuated control comprises a first actuator for requesting alternate program information residing on a higher hierarchical level than said current scene, and a second actuator for requesting alternate program information residing on the same hierarchical level as said current scene.

22. The method of claim 1, wherein said step (1) comprises the step of initially conveying linear program information at a top hierarchical level.

23. A computer-readable memory for use with a computer, for allowing a user to obtain additional or alternate program information corresponding to a scene being viewed by the user, comprising:

means for receiving, from a content source, program information comprising one or more scenes,
wherein at least one of said one or more scenes have associated control information;

signal reception means for receiving, from the user, a signal indicating a request to receive additional or alternate program information corresponding to a current scene viewed by the user when said signal was initiated;

control means for obtaining, in response to said signal reception means, control information corresponding to said current scene;

first requesting means for requesting from said content source, based upon said control information, additional program information corresponding to said current scene, when said signal indicates a request to receive said additional program information;

second requesting means for requesting from said content source, based upon said control information, alternate program information when said signal indicates a request to receive alternate program information corresponding to said current scene; and means for receiving, from said content source, linear program information where said signal is not received by said signal reception means after a period of time has elapsed.

24. A machine for allowing a user to obtain additional or alternate program information corresponding to a scene being viewed by the user, comprising:

a content source for storing program information, wherein said program information comprises one or more scenes;

a viewing device for displaying selected program information from said content source;

a user control device for generating a request for additional program information or alternate program information based upon a current scene being viewed by the user,
wherein said current scene is one of said one or more scenes; and a transmission system for conveying said program information to said viewing device, and for conveying said request to said content source,
wherein additional program information corresponding to said current scene is conveyed to said viewing device from said content source when said signal indicates a request to receive said additional program information;
wherein alternate program information corresponding to said current scene is conveyed to said viewing device from said content source when said signal indicates a request to receive alternate program information, and
wherein linear program information is conveyed to said viewing device from said content source where no request is made by the user after a period of time has elapsed.

25. The machine of claim 24, wherein said content source is a computer device utilizing media server software.

26. The machine of claim 24, wherein said viewing device is a computer.

27. The method of claim 26, wherein said content source comprises a storage device on said computer device.

28. The machine claim of claim 24, wherein said viewing device is a television set.

29. The machine claim of claim 24, wherein said signal is generated by a user control device comprising a first user-actuated control for indicating a request for additional program information and a second user-actuated control for indicating a request for alternate program information.

30. The machine of claim 29, wherein said second user-actuated control comprises a first actuator for requesting alternate program information residing on a higher hierarchical level than said current scene, and a second actuator for requesting alternate program information residing on the same hierarchical level as said current scene.

31. The machine of claim 24, wherein said program information conveyed to the user is initially linear.

32. The machine of claim 24, wherein said at least one of said one or more scenes have associated time code information.

33. The machine of claim 32, wherein said time code information is SMPTE time code information.

34. The machine of claim 33, wherein said additional program information is obtained using an Edit Decision List.

35. The machine of claim 24, further comprising means for identifying when said additional program information conveyed to the user has ended, and for conveying to the user said current scene to which said additional program information corresponded.

36. The machine of claim 24, further comprising means for identifying when said additional program information conveyed to the user has ended, and for conveying to the user a scene subsequent to said current scene to which said additional program information corresponded.

37. The machine of claim 24, wherein program information conveyed to the user prior to the elapsing of said period of time is part of said linear program information, wherein said linear program information resides at a top hierarchical level.

38. The machine of claim 24, further comprising means for identifying when said additional program information conveyed to the user has ended, wherein said current scene to which said additional program information corresponded is then conveyed to the user,
wherein said current scene is a part of said linear program information residing at a top hierarchical level.

39. The machine of claim 24, further comprising means for indicating that no additional program information is available when a request for additional program information occurs and said current scene has no additional program information corresponding to it.

40. The machine of claim 39, wherein said means for indicating that no additional program information is available comprises ignoring said request.

41. The machine of claim 24, wherein said additional program information is at a lower hierarchical level than said current scene.

42. The machine of claim 41, wherein said alternate program information is said current scene.

43. The machine of claim 41, wherein said alternate program information is a scene after said current scene.

44. The machine of claim 41, wherein said alternate program information is a scene after a scene corresponding to said additional program information, at said lower hierarchical level.

45. The machine of claim 24, wherein said transmission system utilizes the Internet.

46. The machine of claim 24, wherein said transmission system utilizes a telephone system.

47. The machine of claim 46, wherein said transmission system utilizes the Internet.

48. The machine of claim 24, wherein said transmission system utilizes a cable TV system.

49. The machine of claim 48, wherein said transmission system utilizes the Internet.

50. The machine of claim 24, wherein said transmission system utilizes radio frequency technology.

51. A computer-readable medium for use with a computer, for allowing a user to obtain additional or alternate program information corresponding to a scene being viewed by the user, comprising:

means for receiving, from a content source, program information comprising one or more scenes,
      wherein at least one of said one or more scenes have associated control information;
   signal reception means for receiving, from the user, a signal indicating a request to receive additional or alternate program information corresponding to a current scene viewed by the user when said signal was initiated;
   control means for obtaining, in response to said signal reception means, control information corresponding to said current scene;
   first requesting means for requesting from said content source, based upon said control information, additional program information corresponding to said current scene, when said signal indicates a request to receive said additional program information;
   second requesting means for requesting from said content source, based upon said control information, alternate program information when said signal indicates a request to receive alternate program information corresponding to said current scene; and
   means for receiving, from said content source, linear program information where said signal is not received by said signal reception means after a period of time has elapsed.

52. The computer-readable medium of claim 51, wherein said at least one of said one or more scenes have associated time code information.

53. The computer-readable medium of claim 52, wherein said time code information is SMPTE time code information.

54. The computer-readable medium of claim 53, wherein said additional program information is obtained using an Edit Decision List.

55. The computer-readable medium of claim 51, wherein said program information conveyed to the user is initially linear.

56. The computer-readable medium of claim 51, further comprising means for identifying when said additional program information conveyed to the user has ended, and for conveying to the user said current scene to which said additional program information corresponded.

57. The computer-readable medium of claim 51, further comprising means for identifying when said additional program information conveyed to the user has ended, and for conveying to the user a scene subsequent to said current scene to which said additional program information corresponded.

58. The computer-readable medium of claim 51, wherein program information conveyed to the user prior to the elapsing of said period of time is part of said linear program information, wherein said linear program information resides at a top hierarchical level.

59. The computer-readable medium of claim 51, further comprising means for identifying when said additional program information conveyed to the user has ended, wherein said current scene to which said additional program information corresponded is then conveyed to the user,
   wherein said current scene is a part of said linear program information residing at a top hierarchical level.

60. The computer-readable medium of claim 51, further comprising means for indicating that no additional program information is available when a request for additional program information occurs and said current scene has no additional program information corresponding to it.

61. The computer-readable medium of claim 60, wherein said means for indicating that no additional program information is available comprises ignoring said request.

62. The computer-readable medium of claim 51, wherein said additional program information is at a lower hierarchical level than said current scene.

63. The computer-readable medium of claim 62, wherein said alternate program information is said current scene.

64. The computer-readable medium of claim 62, wherein said alternate program information is a scene after said current scene.

65. The computer-readable medium of claim 62, wherein said alternate program information is a scene after a scene corresponding to said additional program information, at said lower hierarchical level.

66. A machine for allowing a user to obtain additional or alternate program information corresponding to a scene being viewed by the user, comprising:

transmission means for conveying, from a content source to the user, program information comprising one or more scenes,
      wherein at least one of said one or more scenes have associated control information;
   signal reception means for receiving, from the user, a signal indicating a request to receive additional or alternate program information corresponding to a current scene viewed by the user when said signal was initiated;
   control means for obtaining, in response to said signal reception means, control information corresponding to said current scene;
   first conveyance means for conveying to the user, based upon said control information, additional program information corresponding to said current scene, when said signal indicates a request to receive said additional program information;
   second conveyance means for conveying to the user, based upon said control information, alternate program information when said signal indicates a request to receive alternate program information corresponding to said current scene; and
   third conveyance means for conveying linear program information to the user where no request is made by the user after a period of time has elapsed.

67. The machine of claim 66, wherein said content source is a computer device utilizing media server software.

68. The method of claim 67, wherein said content source comprises a storage device on said computer device.

69. The machine claim of claim 66, wherein said user control device comprises a first user-actuated control for indicating a request for additional program information and a second user-actuated control for indicating a request for alternate program information.

70. The machine of claim 69, wherein said second user-actuated control comprises a first actuator for requesting alternate program information residing on a higher hierarchical level than said current scene, and a second actuator for requesting alternate program information residing on the same hierarchical level as said current scene.

71. The machine of claim 66, wherein said program information conveyed to the user is initially linear.

72. The machine of claim 66, wherein said at least one of said one or more scenes have associated time code information.

73. The machine of claim 72, wherein said time code information is SMPTE time code information.

74. The machine of claim 73, wherein said additional program information is obtained using an Edit Decision List.

75. The machine of claim 66, further comprising means for identifying when said additional program information conveyed to the user has ended, and for conveying to the user said current scene to which said additional program information corresponded.

76. The machine of claim 66, further comprising means for identifying when said additional program information conveyed to the user has ended, and for conveying to the user a scene subsequent to said current scene to which said additional program information corresponded.

77. The machine of claim 66, wherein program information conveyed to the user prior to the elapsing of said period of time is part of said linear program information, wherein said linear program information resides at a top hierarchical level.

78. The machine of claim 66, further comprising means for identifying when said additional program information conveyed to the user has ended, wherein said current scene to which said additional program information corresponded is then conveyed to the user, wherein said current scene is a part of said linear program information residing at a top hierarchical level.

79. The machine of claim 66, further comprising means for indicating that no additional program information is available when a request for additional program information occurs and said current scene has no additional program information corresponding to it.

80. The machine of claim 79, wherein said means for indicating that no additional program information is available comprises ignoring said request.

81. The machine of claim 66, wherein said additional program information is at a lower hierarchical level than said current scene.

82. The machine of claim 81, wherein said alternate program information is said current scene.

83. The machine of claim 81, wherein said alternate program information is a scene after said current scene.

84. The machine of claim 81, wherein said alternate program information is a scene after a scene corresponding to said additional program information, at said lower hierarchical level.

85. The machine of claim 66, wherein said transmission means utilizes the Internet.

86. The machine of claim 66, wherein said transmission means utilizes a telephone system.

87. The machine of claim 86, wherein said transmission means utilizes the Internet.

88. The machine of claim 66, wherein said transmission means utilizes a cable TV system.

89. The machine of claim 88, wherein said transmission means utilizes the Internet.

90. The machine of claim 66, wherein said transmission means utilizes radio frequency technology.

* * * * *